Dec. 16, 1947.  B. B. BACHMAN ET AL  2,432,712
GEAR SHIFTING MECHANISM
Filed Aug. 31, 1943  6 Sheets-Sheet 2
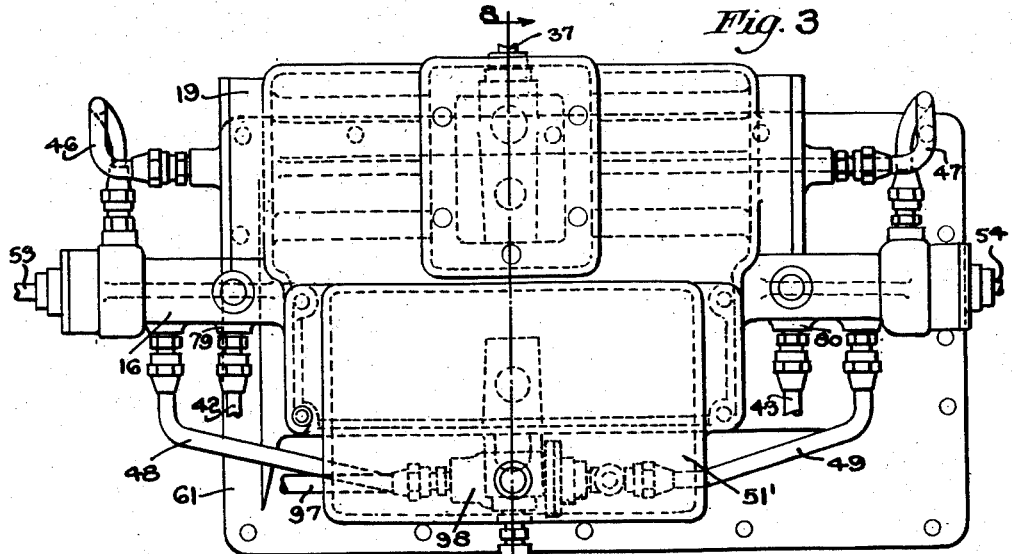
Fig. 3
Fig. 5
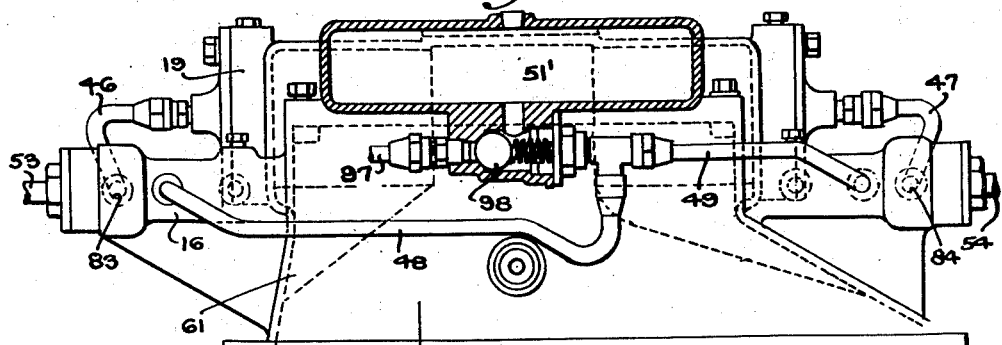
Fig. 4
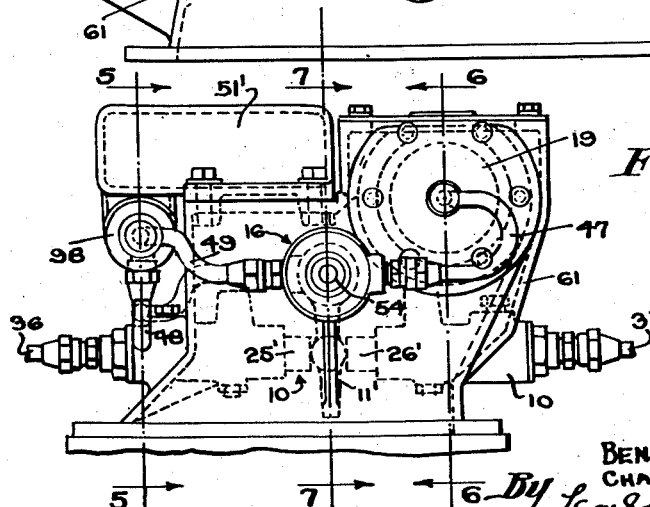
Inventor
BENJAMIN B. BACHMAN
CHARLES E. FOGG
By Leo Edelson Attorney

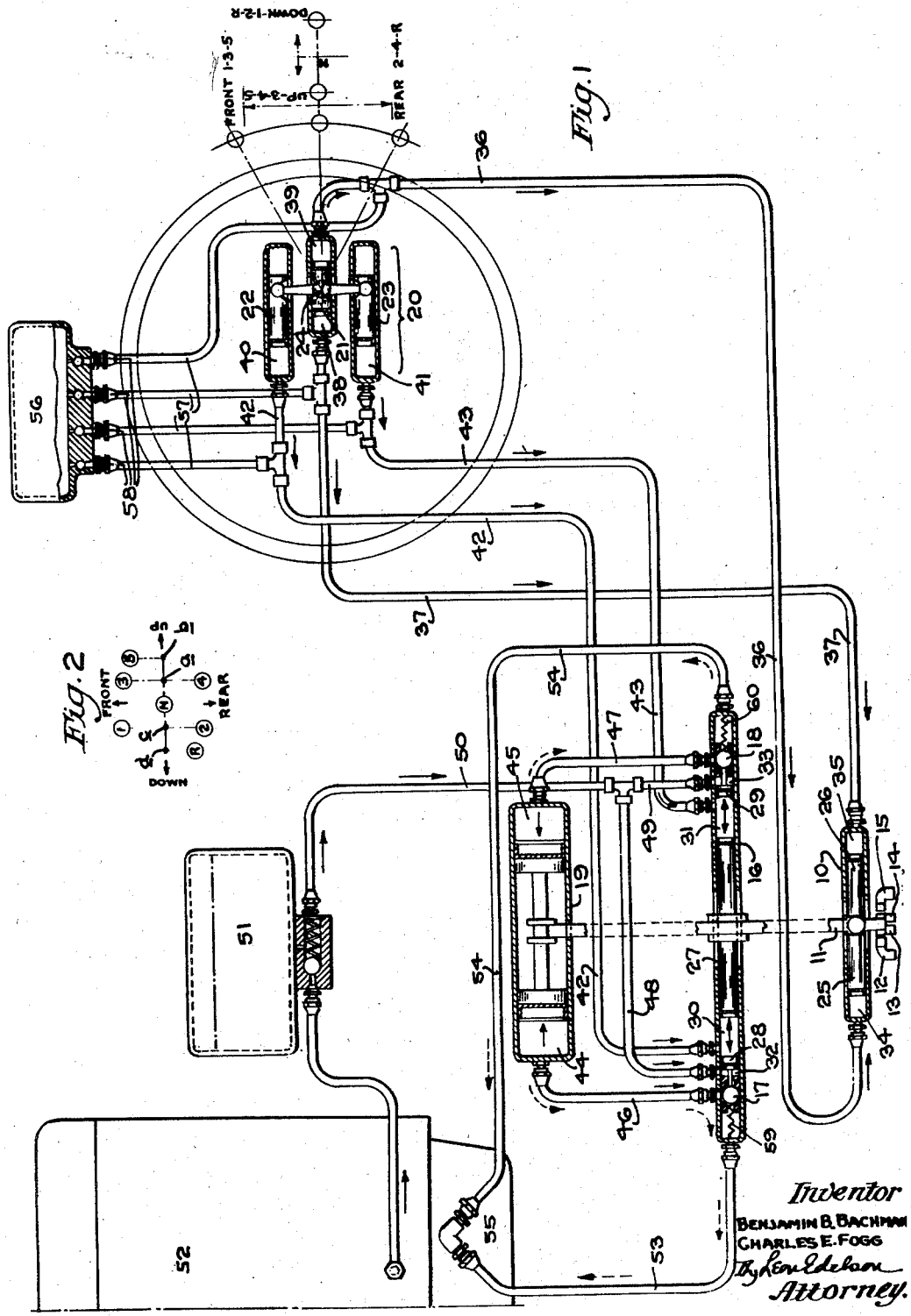

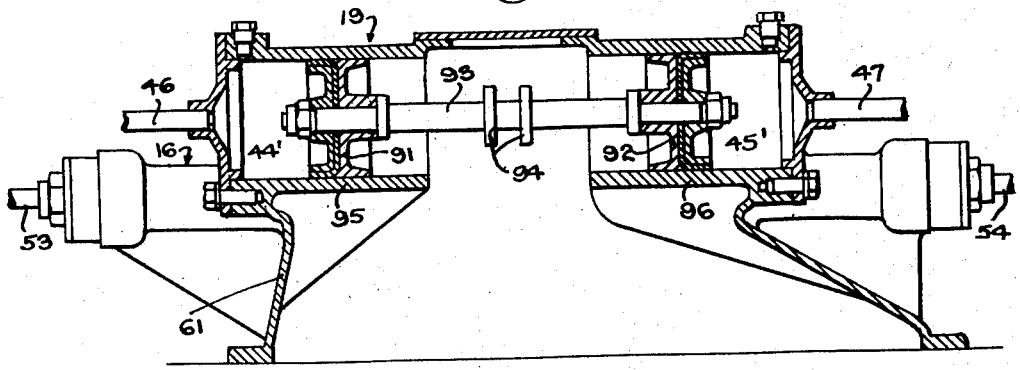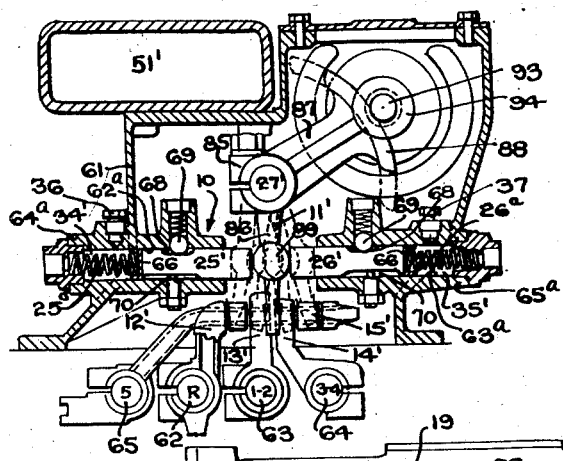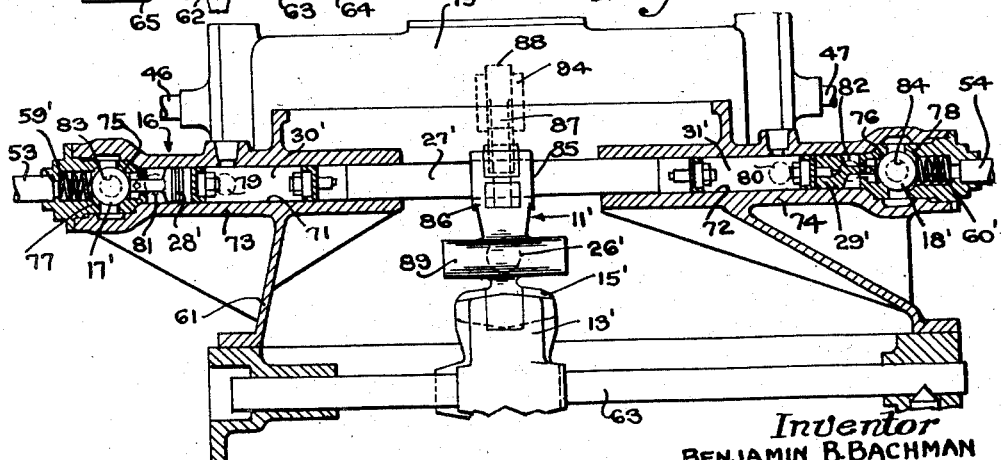

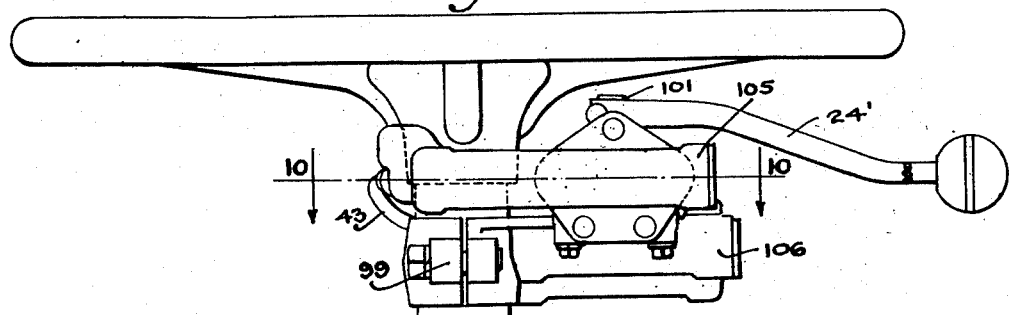
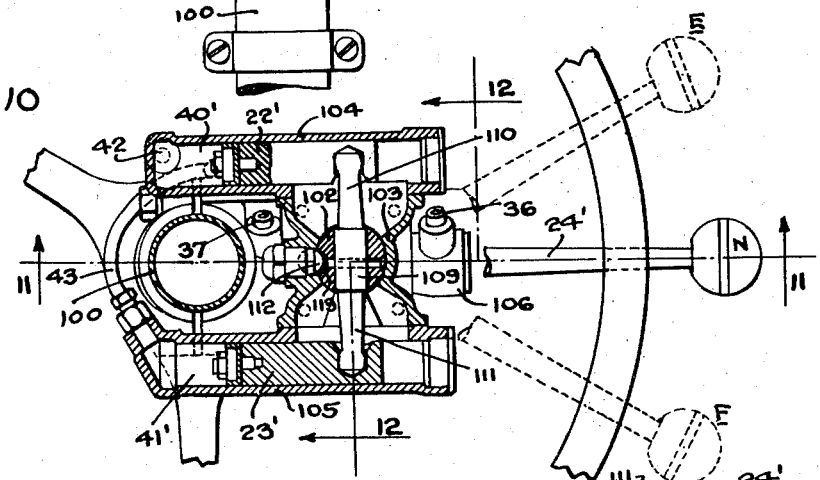
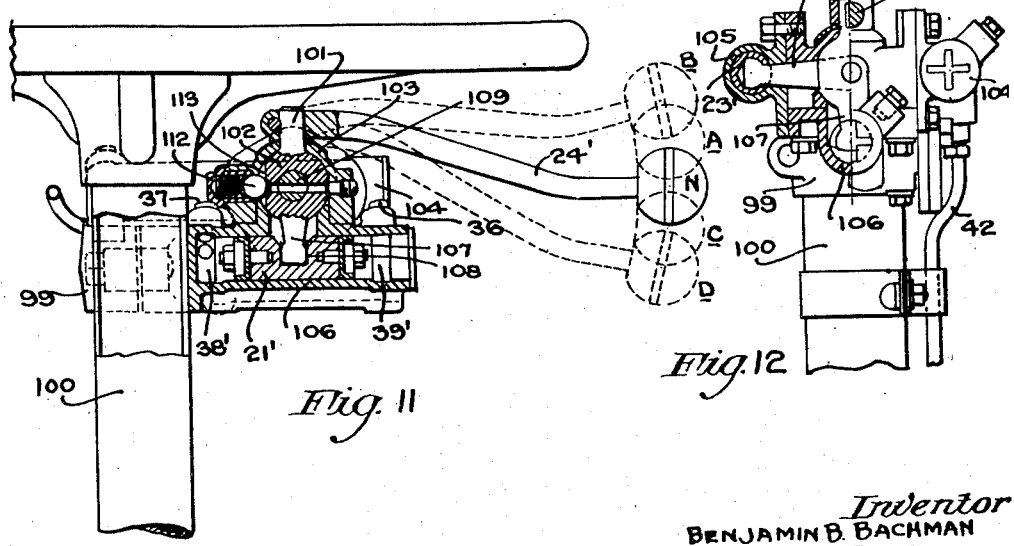

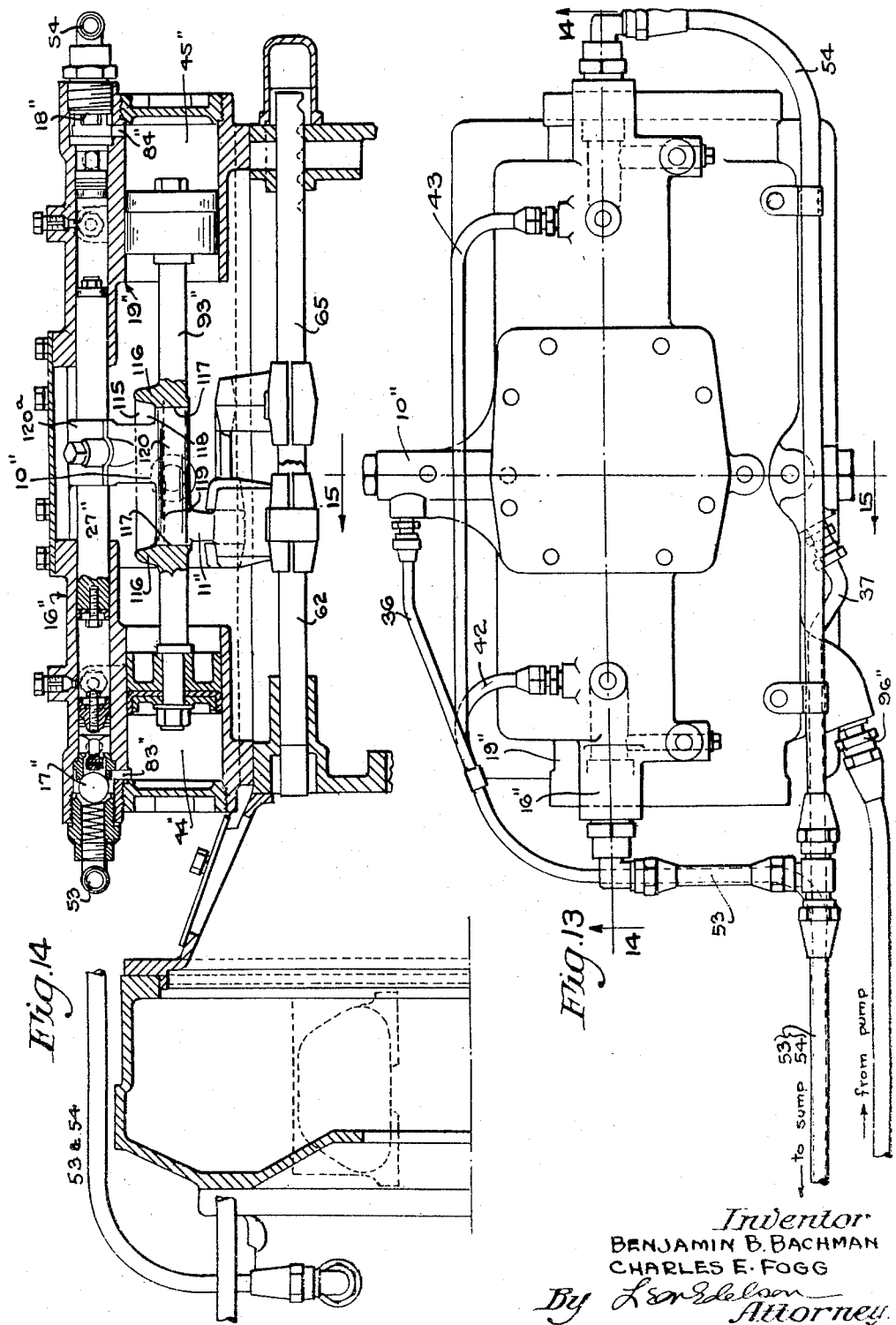

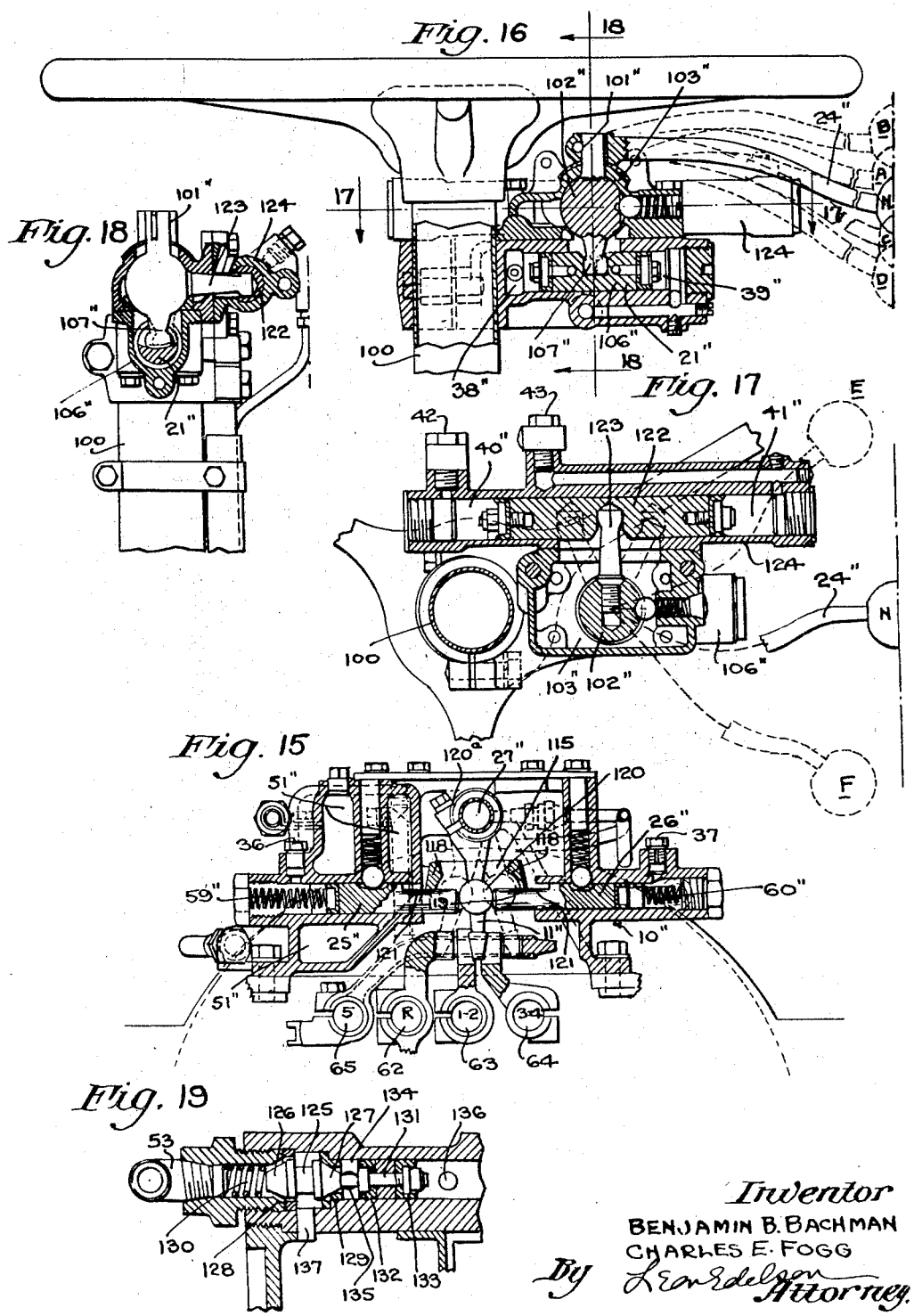

Patented Dec. 16, 1947

2,432,712

UNITED STATES PATENT OFFICE 2,432,712

GEAR SHIFTING MECHANISM

Benjamin B. Bachman, Philadelphia, and Charles E. Fogg, Ardmore, Pa., assignors to The Autocar Company, Ardmore, Pa., a corporation of Pennsylvania Application August 31, 1943, Serial No. 500,626

28 Claims. (Cl. 74—335)

This invention relates generally to a motor vehicle transmission control system and more particularly to a mechanism for controlling the selection and establishing the various gear relations of the transmission, it being among the principal objects of the present invention to provide a system wherein the several mechanisms employed for selecting the desired gear relation to be established and for actually effecting the establishment of such pre-selected gear relation are operated entirely by fluid pressure.

In its broadest aspect, the present invention contemplates the provision and use of fluid pressure means so operatively associated that upon selection of a desired gear relation to be established through the medium of a non-compressible fluid, such as oil, and the actuation of one or the other of a pair of control valves, also through the medium of a non-compressible fluid, a fluid pressure motor becomes immediately operative to shift the gears of the transmission into the preselected gear relation. Generally described, the apparatus of the present invention includes several fluid pressure systems which while independent of each other are, nevertheless, so interrelated in operation that a single control member conveniently situated in the vicinity of the steering wheel is all that is required for selection and shifting of the gears as desired. These several fluid pressure systems respectively actuate (1) a lateral shift control mechanism for selectively moving the transmission shift lever into operative engagement with any one of the transmission shift rods; (2) a longitudinal shift control mechanism for selectively actuating either one of a pair of valves controlling the delivery of a fluid pressure medium, such as oil, to one side or the other of a power cylinder; and (3) a power cylinder for selectively moving the selected shift rod in one direction or the other to establish the desired gear relation.

This power cylinder for shifting the gears into operative meshed relation is actuated by fluid pressure delivered from a suitable source of supply, the flow of the fluid pressure medium from the supply source being controlled by a pair of spring-pressed valves normally biased to close both ends of the power cylinder against the delivery thereto of the high pressure fluid. Preferably, the control valve arrangement is such that when the valves are spring-pressed into their normal closed positions, both ends of the power cylinder are in free communication with and so permit the free discharge of the pressure fluid into a sump, which may be the crank-case of the vehicle engine. Thus, while the valves are in their normal closed position, there is no actuating pressure of the fluid on either end of the power cylinder and the latter is therefore free to assume an intermediate or neutral position consistent with the positions assumed by the longitudinal and lateral control mechanisms when the control member is moved into neutral position.

In order to actuate the power cylinder and cause it to shift in one direction or the other, fluid pressure means, entirely independent of the power cylinder, is provided for selectively actuating the control valves to thereby permit the passage to the power cylinder of the fluid pressure medium for actuating the cylinder. The fluid pressure means for so actuating the cylinder control valves consists of a pair of conduits through each of which a non-compressible fluid, such as oil, is forced by means of suitably actuated plunger elements, these plunger elements, which are immediately associated with the control member, being so selectively operable that simultaneously as one of the fluid columns is subjected to pressure in a given direction, the other fluid column is relieved of pressure so that the fluid therein is free to move in the opposite direction. These plunger-actuated fluid columns, which control the operation of a double-action plunger forming part of the longitudinal shift control mechanism, are independent not only of each other, but also of the high pressure fluid system for the power cylinder.

The lateral shift control mechanism, by means of which pre-selection of the desired gear relation is obtained, is also actuated by a non-compressible fluid, such as oil, this fluid being confined in a self-contained, closed system which also is independent of the fluid pressure systems for governing the operation of the power cylinder control valves and for actuating the power cylinder. This lateral shift control mechanism includes a pair of plungers operative upon either side of the pivoted shift lever so that movement of these plungers in one direction or the other causes the shift lever to rock about its axis to select any one of a number of gear shifting rods or rails, these plungers of the shift control mechanism being fluid-pressure actuated through the medium of a pair of independent fluid pressure columns which respectively extend between the pair of single-action plungers immediately associated with the gear shift lever and the double-acting plunger immediately associated with the control member.

The fluid actuating systems for the lateral shift control mechanism (gear selecting) and for the longitudinal shift control mechanism (power cylinder valve actuating) are selectively operated by a compact control mechanism which is mounted on the steering column adjacent the steering wheel and which includes a universally mounted operating handle for actuating the several plungers above referred to for imparting power thrusts to the fluid columns respectively associated therewith. This control mechanism is so designed that when the operating handle is in a given centered or neutral position, both of the lateral and longitudinal shift control mechanisms are in centered or neutralized position, the control valves for the power cylinder being then both closed to immobilize the latter while gear transmission is in neutral position.

However, when the operating handle is raised vertically, the double-action plunger of the control mechanism is operated in a direction as to cause the shift lever to rock about its axis to such degree as to selectively engage a predetermined shifting rod, while when the handle is depressed, the double-action plunger operates in the reverse direction to cause the shift lever to reversely rock about its axis to such degree as to selectively engage another of the gear shifting rods. On the other hand, when the operating handle is shifted laterally in one direction or the other, other fluid energizing plungers of the control mechanism are selectively actuated to open one or the other of the valves controlling the supply of fluid pressure to the power cylinder, and depending upon which of these valves is opened, the power cylinder is moved in one direction or the other to shift the selected gear shifting rod or rail. Thus, by proper coordination in movement of the operating lever vertically and laterally, which is easily accomplished, the gear shifting rods may be selectively engaged and shifted to readily effect the particular gear relation desired.

From the foregoing general description, it will be appreciated that it is an important object and advantage of the present invention to provide an hydraulically-operated system for pre-selecting and shifting the gears into the desired gear relation, the operation of which is effected expeditiously and with minimum effort by a remotely located single actuating member having a capacity for movement in intersecting planes very much on the order of the conventional gear shift lever to operate the change-speed transmission.

A further important object of the invention is to provide a system of inter-related fluid transmitting conduits which are severally self-contained and so related in operation that while certain of them function under direct manual control to impart, by means of non-compressible fluid columns, the necessary energy for actuating the gear selecting mechanism and the valves controlling the power cylinder fluid circuit, the latter functions automatically to shift the gears once the valves are so actuated. In other words, having pre-selected a desired gear relation and having actuated the longitudinal shift control mechanism, the actual gear shifting is effected automatically.

Another object of the present invention is to provide an hydraulically-operated system of the character hereinbefore described which is simple, durable and inexpensive to manufacture, which is easy to maintain and service in operation, and which may be readily installed for operation of conventional change-speed transmissions without necessitating any special changes in design or operation of the latter, and which may be independent in operation of the vehicle clutch mechanism.

Still another object is to provide a system which is adapted for operating the shifter rods of a conventional transmission mechanism having a plural number of forward speeds and one reverse, the system of the present invention being readily adapted for use even in a transmission having as many as five speeds forward.

A still further object is to provide an hydraulically-operated system of the character aforesaid which is designed, in the event of failure of automatic operation of the power cylinder to effect the final gear shifting operation, for manual shifting of the gears through the medium of the non-compressible fluid contained in the conduits controlling the operation of the longitudinal shift control mechanism, the fluid columns in such case serving to transmit the movement of the remote control lever directly to the gear shifting rod to thereby effect manual shifting of the gears.

A still further object of the present invention is to provide in an hydraulically-operated system for selecting and shifting gears, means enabling the operator to "feel" the selection of the proper gear relationship desired, thereby insuring against unintentionally shifting into the wrong speed.

Other objects of the present invention, as well as advantages and economies effected by the design and operation of the several mechanisms thereof, will be apparent more fully hereinafter, it being understood that the present invention consists substantially in the combination, construction, location and relative arrangement of parts, all as will be described more fully hereinafter, as are shown in the accompanying drawings, and as are pointed out in the accompanying claims.

In the said accompanying drawings, which are illustrative of the general principles of the present invention, there being no intention to limit the invention to the exact constructions illustrated, Figure 1 is a general diagrammatic or schematic view of a system constructed in accordance with and embodying the principles of the present invention;

Figure 2 is a shift diagram illustrating the various positions assumed by the manual control lever for obtaining the different gear relations desired;

Figures 3 to 12 are views showing the constructional details of one form of apparatus constructed in accordance with and embodying the principles of the present invention whereof Figure 3 is a plan view of that part of the apparatus which is immediately associated with the gear transmission mechanism;

Figure 4 is an end elevational view of the mechanism shown in Figure 3;

Figure 5 is a side elevational view shown partially in section as taken along the lines 5—5 of Figure 4;

Figure 6 is a vertical sectional view taken along the lines 6—6 of Figure 4;

Figure 7 is a sectional view taken along the lines 7—7 of Figure 4;

Figure 8 is a transverse sectional view taken along the lines 8—8 of Figure 3;

Figure 9 is a side elevational view of the control mechanism mounted upon the steering wheel column;

Figure 10 is a transverse sectional view taken along the lines 10—10 of Figure 9;

Figure 11 is a vertical sectional view taken along the lines 11—11 of Figure 10; and Figure 12 is a view, shown partly in section as taken along the lines 12—12 of Figure 10;

Figures 13 to 18, inclusive, are views showing the constructional details of a modified form of apparatus constructed in accordance with and embodying the principles of the present invention whereof Figure 13 is a top plan view of that part of the mechanism which is immediately associated with the gear transmission;

Figure 14 is a vertical sectional view taken along the lines 14—14 of Figure 13;

Figure 15 is a transverse sectional view taken along the lines 15—15 of Figure 13;

Figure 16 is a vertical sectional view of the control mechanism shown mounted upon the steering wheel column;

Figure 17 is a horizontal sectional view taken substantially on the lines 17—17 of Figure 16; and Figure 18 is a sectional view taken substantially on the lines 18—18 of Figure 16; and Figure 19 is an enlarged sectional view showing in detail a modified construction of one of the control valves and associated parts for controlling the flow of pressure fluid to and from the power cylinder.

Referring now to the drawings and more particularly to Figure 1 thereof which diagrammatically illustrates the system of the pressure invention and in which the several elements thereof are shown more or less diagrammatically, it will be observed the system comprises generally the lateral shift control mechanism 10 for selectively moving the transmission shift lever 11 into operative engagement with any one of the transmission shift rod yokes 12, 13, 14 and 15; the longitudinal shift control mechanism 16 for selectively actuating either one of a pair of valves 17 and 18 controlling the delivery of the fluid pressure medium, such as oil, to either side of the power cylinder 19; and the operating control mechanism 20 for effecting the operation of the lateral shift and longitudinal shift control mechanisms. It will be noted that Figure 1 shows the lateral shift control mechanism 10 arranged with its axis of operation paralleling that of the longitudinal shift control mechanism 16, and it will be understood that such showing is only diagrammatic and that in actual practice, the apparatus of the present invention is so constructed that the longitudinal axis of the lateral shift control mechanism extends at right angles to that shown in Figure 1, as more clearly appears in other figures of the drawings. In other words, the plane of movement of the transmission shift lever 11 for selection of the desired gear relation is normal to the plane of movement thereof for actual shifting of the gears.

The operating control mechanism 20, which is designed as a compact unit adapted to be mounted upon the steering wheel column, generally includes a double-action plunger 21, a pair of single action plungers 22 and 23, and manually-operated universally-mounted operating lever 24 for selectively actuating the plungers 21, 22 and 23 in accordance with the shift diagram of Figure 2. Preferably, the lever 24 is so mounted that it may be shifted through neutral in either of two substantially perpendicular planes of movement so that by properly coordinating the movement of the lever in its two planes of movement any desired gear relation may be pre-selected, as is indicated in the shift diagram of Figure 2. Thus, for shifts into first, second and reverse speeds, the operating lever is moved downwardly in a given plane and thence laterally to one side or the other of said plane, the extent of downward movement and direction of lateral movement depending upon which of said speeds it is desired to establish, while for shifts into third, fourth and fifth (or overdrive) speeds the lever is moved upwardly in said plane and thence laterally thereof, the extent of the upward movement and direction of lateral movement being again dependent upon which of the said latter speeds is desired to be established.

The lateral shift control mechanism 10 consists essentially of a pair of axially alined, reversely operable single-action plungers 25 and 26, the proximate ends of which respectively engage opposite sides of the gear shift lever 11, while the longitudinal shift control mechanism 16 essentially consists of a double-action plunger 27 and a pair of single-action plunger elements 28 and 29 respectively associated with and designed for actuating the valves 17 and 18 which control the operation of the main power cylinder 19. This latter cylinder is in turn so operatively associated with the double-action plunger 27 of the longitudinal shift control mechanism and with the transmission shift lever 11 that movement of the power cylinder in one direction or the other results in corresponding simultaneous movement of the plunger 27 and the transmission shift lever 11.

It will be observed that the double-action plunger 27 serves conjointly with the plunger elements 28 and 29 to form a pair of closed fluid pressure chambers 30 and 31, and also that suitable passages 32 and 33 for the power cylinder pressure medium are provided exteriorly of these chambers, these latter passages being those controlled by the valves 17 and 18.

All of the plunger members hereinbefore described are suitably housed in cylinders to provide pressure chambers at the operating ends of the plungers, and these chambers are so connected by suitable conduits as to provide the several fluid pressure systems hereinbefore referred to. Thus, the chambers 34 and 35 provided at the pressure-exerting ends of the plungers 25 and 26 of the lateral shift control mechanism are respectively connected, by way of the conduits 36 and 37, to the chambers 38 and 39 provided at the pressure-exerting ends of the double-action plunger 21 of the operating control mechanism 20. The chambers 30 and 31 of the longitudinal shift control mechanism 16 are respectively connected to the chambers 40 and 41 provided at the pressure-exerting ends of the single-action plungers 22 and 23 of the operating control mechanism by way of the conduits 42 and 43.

The chambers 44 and 45 at the opposite ends of the main power cylinder 19 are respectively connected to the outer ends of the aforesaid valve-controlled passages 32 and 33 by the conduits 46 and 47, while the inner ends of these passages are commonly connected by means of the conduits 48, 49 and 50 to a suitable source of fluid under pressure, such as the constant pressure tank 51 which is supplied with oil under suitable pressure directly from the engine 52 of the vehicle. The outer ends of the valve-controlled passages 32 and 33 and accordingly the conduits 46 and 47 are normally in direct communication by means of the conduits 53 and 54 with any suitable sump open to atmospheric pressure, such as the crankcase 55 of the engine, in consequence of which the opposite ends of the power cylinder are normally relieved of any actuating fluid pressure.

In order to insure maintenance of a constant volume of the pressure fluid in the several closed pressure systems for actuating the lateral and longitudinal shift control mechanisms, an oil supply tank 56 is preferably employed from which oil may be supplied by gravity or otherwise to replenish any that may be dissipated in the normally closed systems, the oil being delivered thereto by way of a plurality of the individual conduits 57 each having a check-valve 58 included therein to prevent back flow of the oil into the supply tank.

In the operation of the system as diagrammatically shown in Figure 1, the first step, of course, would be to preselect the gear relation desired to be established, following which the actual gear shift would be effected. Both of these steps are carried out by movement of the lever 24 in its two planes of movement. Thus, assuming that it is desired to shift into either first or second speed, the lever 24 is depressed to cause the double-action plunger 21 to move from its neutral position, as shown in Figure 1, toward the left, thereby causing the fluid column in conduit 37 to move sufficiently to effect a corresponding movement of the plunger 26 and consequently of the transmission shift lever 11. The downward movement of the operating lever 24 is only such as is necessary to effect engagement of the shift lever 11 with the yoke 13 secured to the shift rod for the first and second speed gears. Were it desired to shift into reverse, then the operating lever would be depressed to still further extent (see the shift diagram of Figure 2) to thereby cause correspondingly greater traverse of the fluid column through the conduit 37 with the result that the plunger 26 would shift the gear shift lever 11 into engagement with the reverse gear shift rod yoke 12.

On the other hand, should it be desired to shift into either third or fourth speed, then the operating lever 24 would be so raised as to shift the double-action plunger 21 to the right and cause traverse of the fluid column through the conduit 36 to an extent sufficient to actuate the plunger 25 and effect engagement of the gear shift lever 11 with the yoke 14 secured to the shift rod for the third and fourth speed gears. By raising the operating lever 24 still further, the fluid column in conduit 36 is given a greater traverse and so effects a correspondingly greater movement of the plunger 25 to thereby cause the gear shift lever to engage the fifth speed or overdrive shift rod yoke 15.

Having so pre-selected the gear relation desired to be established, the operating lever is moved laterally to one side or the other of its first plane of movement to effect the actual gear shift as follows. Assuming that first speed has been preselected, the operating lever 24 will have been depressed into the position designated c in the gear shift diagram of Figure 2, and in this position of the operating lever the gear shift lever 11 will be in engagement with the clevis 13 of the first and second speed shift rod. Thereafter, the operating lever is moved laterally into the position indicated by 1 in the shift diagram of Figure 2, the result of such movement of the operating lever being to simultaneously shift the single-action plunger 22 to the left and the companion single-action plunger 23 to the right. The fluid column in conduit 42 thus exerts a positive pressure on the plunger element 28 to open the valve 17, at the same time that the traverse of the fluid column in conduit 43 is in such direction as to exert no actuating pressure on the plunger element 29, the valve 18 thus remaining closed as shown.

Immediately upon opening of the valve 17, the high pressure fluid from the pressure tank 51 is delivered by way of the conduits 50, 48 and 46 to the pressure chamber 44 of the power cylinder 19 and so causes the piston thereof to move to the right, the opposite end pressure chamber 45 of the power cylinder being in free communication with the sump 55 by way of the conduits 47 and 54. Inasmuch as the power cylinder piston is coupled to the transmission gear shift lever 11, its movement to the right imparts a corresponding movement to the gear shift lever and so causes the gear shift rod to shift into first speed position, this shifting into gear being effected by the power cylinder automatically upon the opening of the valve 17.

In order to shift into second, all that would be necessary, assuming the operating lever to be in first speed position, is for the lever to be shifted in the opposite direction to assume the position indicated by 2 in Figure 2, in which event the single-action plungers 22 and 23 are so reversely actuated that the fluid column in conduit 43 exerts a positive pressure on the plunger element 29 to open the valve 18, the other valve 17 remaining closed. In this condition of the apparatus, the high pressure fluid from the storage tank 51 is delivered to the pressure chamber 45 of the power cylinder 19 to thereby move the power cylinder piston to the left and so cause the gear shift rod to shift into the second speed position.

Should it be desired to shift into reverse speed, the operating lever would first be moved into the position d (see the shift diagram of Figure 2) for selection of reverse speed as hereinbefore described, following which it would be moved laterally in the same direction as for shifting into second speed, with the result that the power cylinder piston, in moving to the left, would carry with it the gear shift lever 11 and the reverse speed shift rod connected to the latter.

The same procedures would be followed, of course, for shifting into the other speeds, the third and fourth speeds being obtained by first shifting the operating lever into the position indicated by a in the shift diagram of Figure 2, to thereby select the proper shift rod for these speeds and then moving the lever into one or the other of the positions 3 and 4 to open one or the other of the valves 17 and 18 (valve 17 for the third speed position and valve 18 for the fourth speed position), thereby permitting delivery of the high pressure fluid into the proper end of the power cylinder for actuation of its piston in the required direction.

For shifting into fifth speed or overdrive, the operating lever is initially moved into the position indicated by b in the shift diagram of Figure 2, to thereby selectively engage the gear shift 11 with the yoke 15 of the overdrive shift rod, following which the operating lever is moved laterally in the same direction as for shifting into third speed, with the result that as the valve 17 is opened, the power cylinder piston moves to the left and carries with it the gear shift lever 11 and the overdrive shift rod connected to the latter.

As has been indicated, when the several parts of the apparatus are relatively arranged as shown in Figure 1, the system is in its neutral position, the valves 17 and 18 being then both closed against the delivery of high pressure fluid to either end of the power cylinder and said ends being both in direct communication with the sump. Normally the valves are maintained in their closed positions by the springs 59 and 60 which are respectively biased in opposition to the forces exerted by the fluid columns in the conduits 42 and 43.

Of course, to reestablish neutral condition of the system, it is only necessary to reverse the procedure hereinbefore described through operation of the control lever 24, it being noted in this connection that as this lever is shifted into the neutral position, the single-action plungers 22 and 23 operate in reverse directions to equalize the forces exerted by the fluid columns in the conduits 42 and 43 upon the opposite ends of the plunger member 27 of the longitudinal shift control mechanism, at the same time that the double-action plunger 21 operates to equalize the forces exerted by the fluid columns in the conduits 36 and 37 upon the outer ends of the plunger members 25—26 of the lateral shift control mechanism. In consequence of this, when the control lever 24 is operated to actuate the power cylinder unit for return of a particular gear shift rod from its gear establishing position into neutral position, the longitudinal shift control plunger member 27 is free to shift into such neutral position together with the power cylinder piston and the gear shift lever 11 coupled thereto, while the lateral shift control plunger members act on said gear shift lever to shift it laterally out of engagement with the gear shift rod and into neutral position.

At this point it may be noted that the longitudinal shift control plunger member 27 is brought into centered or neutral position by the piston element of the power cylinder 19, due to the fact that the power cylinder piston and the plunger member 27 are mechanically coupled together for synchronous operation. By so mechanically coupling together the power cylinder piston and the plunger member 27, it becomes possible to utilize the fluid columns in the conduits 42 and 43 for manually shifting the gears in the event that the supply of high pressure fluid to the power cylinder is interrupted for any reason. These fluid columns, in such event, act as power thrust media for directly energizing the plunger member 27 to cause it to move in one direction or the other depending upon which of the single-action plungers 22—23 is positively actuated, the movement of the plunger member resulting in shifting of that one of the gear shift rods which is engaged by the gear shift lever 11.

Also, it is important to note at this point that an important and advantageous feature of the present invention is to provide for such operation of the power cylinder unit 19 in longitudinally shifting the gear shift rods into and out of an established gear relation that the movement of the power cylinder piston is at all times substantially in correspondence with the movement of the operating control lever 24 forwardly and rearwardly of its neutral position. In other words, the apparatus of the present invention is so designed that as the lever 24 is shifted to the front or to the rear (see the shift diagram of Figure 2), the power cylinder piston correspondingly shifts to the right or to the left to power-shift the pre-selected gear shift rod into or out of an established gear relation. To this end, the biasing springs 59 and 60, which normally act upon the valves 17 and 18 to maintain them closed, are respectively so balanced in relation to the forces exerted by the fluid columns in the conduits 42 and 43 acting against the valve actuating plunger elements 28 and 29 that immediately as the actuating effort of these fluid column forces is expended, the valves close under the influence of their biasing springs and interrupt the further supply of the fluid pressure medium to the power cylinder.

Thus, as the control lever 24 is moved, for example, from its neutral position forwardly toward the front dotted line position shown in Figure 1, the fluid column in conduit 42 exerts an initial pressure on the plunger element 28 to open the valve 17 against the restraining influence of its spring 59. As the immediate result of such opening of the valve 17, high pressure fluid from the reservoir 51 is delivered through the conduits 50, 48 and 46 to the pressure chamber 44 of the power cylinder unit 19 and causes its piston to shift to the right, thereby moving with it not only the gear shift lever 11, but also the longitudinal shift control plunger 27. The concomitant result of so shifting the plunger 27 is to increase the size of the fluid pressure chamber 30 in the longitudinal shift control unit 16. It will be apparent that by proper design and proportioning of the plunger 27 in relation to its associated parts, the volumetric capacity of the chamber 30 increases in such ratio to the movement of the control lever 24 that when the latter reaches its outer limit, the chamber 30 is of such capacity that the fluid column in conduit 42 no longer exerts an actuating pressure upon the valve 17, whereupon the latter is free to be returned to its closed position under the influence of the spring 59. In this condition of the apparatus, the piston of the power cylinder unit will be in gear establishing position, although the supply of high pressure fluid thereto will have been interrupted by the valve 17.

Obviously, when it is desired to return the power cylinder piston to its centered or neutral position, the control lever 24 is returned from its outermost forward position to the neutral full line position shown in Figure 1, in which event the fluid column in conduit 43 becomes operative to open the valve 18 to thereby permit the flow of high pressure fluid to the chamber 45 of the power cylinder 19, causing the piston unit thereof together with the plunger 27 of the longitudinal shift control unit 16 to return to their centered positions. When this latter position is reached by the power cylinder piston unit (simultaneously as the control lever 24 assumes its neutral position), the chamber 31 of the longitudinal shift control unit will have sufficiently increased in size to relieve the plunger element 29 of the valve 18 of actuating force exerted by the fluid column of conduit 43, whereupon the valve 18 will close under the influence of its spring 60 to interrupt the supply of operating fluid to the power cylinder.

Of course, the operation of the valves 17 and 18 for controlling the movement of the power cylinder piston is similarly effected upon movement of the control lever 24 rearwardly from its neutral position to its outermost rear position shown in Figure 1 and from said latter position back into the neutral position, it being apparent that the operation in all cases is such that the movement of the power cylinder piston in either direction under the influence of the high pressure fluid delivered from a suitable supply, such as the reservoir 81, is in substantial correspondence with and controlled by the movement of the control lever 24. It will be noted, also, that the operation is such that the supply of the high pressure operating fluid to the power cylinder is interrupted by the valves 17 and 18 automatically as the power cylinder piston assumes its neutral or any one of its gear establishing positions, all of which positions are established by the manual shifting of the control lever 24.

It will be understood, of course, that the foregoing is but a general description of the apparatus of the present invention and its operation, and that various arrangements and refinements of the component parts of the system may be employed without departing from the essential principles of this invention. Figures 3 to 12, inclusive, show one form of a practical embodiment of the several mechanisms of the present invention, while Figures 13 to 18, inclusive, illustrate another form of practical embodiment of the invention.

Referring first to the apparatus shown in Figures 3 to 12 and more particularly to Figures 3 to 7, inclusive, which are specific to that part of the apparatus which is directly associated with the gear transmission, it will be observed that the lateral shift control mechanism 10, the longitudinal shift control mechanism 16 and the power cylinder 19, including all operating parts immediately associated therewith, are suitably housed within or mounted on a main casing or frame 61 which is adapted to be suitably secured in position just above the gear transmission shift rods 62, 63, 64 and 65 (see Figure 8). As indicated, these shift rods respectively effect engagement of the transmission in reverse speed, first and second speeds, third and fourth speeds, and fifth speeds, and they are respectively fitted with yokes 12', 13', 14' and 15' for selective engagement by the gear shift lever 11'.

The lateral shift control mechanism

The lateral shift control mechanism 10, as most clearly appears in Figure 8, includes a pair of axially alined plunger elements 25' and 26' respectively fitted within the cylindrical bores 62ª and 63ª of the bosses 64ª and 65ª formed as integral parts of the main housing 61. The outer ends of the plunger elements 25' and 26' are each fitted with the usual form of cup packing 66 to provide the fluid-tight pressure chambers 34' and 35' which respectively are in communication with the fluid pressure conduits 36 and 37. Coiled compression springs 25ª and 26ª tend normally to urge the plunger elements 25' and 26' axially toward each other and so maintain the inner ends thereof in constant engagement with opposite sides of the interposed gear shift lever 11'. Each of the plunger elements is provided with an elongated depression 68 in the surface thereof into which projects a spring-pressed detent 69, the function of which will become apparent hereinafter. Also, the plunger elements 25' and 23' are each splined, as at 70, within their guide bores so that while they are free to move axially they are restrained against rotation about their axes.

The longitudinal shift control mechanism

The longitudinal shift control mechanism 16, as most clearly appears in Figure 7, essentially comprises a central double-action plunger member 27', the opposite ends of which are slidably fitted within the axially spaced cylindrical bores 71 and 72 of the bosses 73 and 74 also formed as integral parts of the main housing 61. Also slidably fitted within the bores 71 and 72 are a pair of plunger elements 28' and 29', which respectively coact with the opposite ends of the central plunger member 27' to form a pair of fluid pressure chambers 30' and 31'. The proximate ends of each pair of coacting plungers is, of course, provided with the usual cup packings, as shown, to form an adequate seal against the loss of fluid from the chambers 30' and 31'. Fitted within the outer end portions of the cylindrical bores 71 and 72 are a pair of spring-pressed spherical valve elements 17' and 18' which are normally respectively pressed against the valve seats 75 and 76 by the compression springs 59' and 60'. In addition to these valve seats 75 and 76, there is provided a second pair of valve seats 77 and 78, each of which is disposed on the outer side of and in normally spaced relation with respect to the valve elements 17' and 18'.

As most clearly appears in Figures 3, 5 and 8, the pressure chambers 30' and 31' of the longitudinal shift control mechanism are respectively in communication with the conduits 42 and 43 by way of the ports 79 and 80. Ports are also provided between each valve element and its actuating plunger element, as at 81 and 82, for respective communication with the conduits 48 and 49, while the outer ends of the valve passages are directly connected to the conduits 53 and 54. In addition, ports 83 and 84, respectively located intermediate each pair of valve seats embracing one of the valve elements, are provided for direct communication with the conduits 46 and 47.

Operatively associated with the longitudinal shift control mechanism and in fact constituting a part thereof is the gear shift lever 11'. This lever is generally of bell crank form, as most clearly appears in Figure 8, and is secured, as at 85, to the central plunger member 27' for oscillation therewith about the axis of said member. The bell-crank lever is provided with a depending arm 86 disposed between the proximate ends of the single-action plungers 25' and 26' of the lateral control shift mechanism and with an upwardly inclined arm 87 terminating in an arcuately shaped end member 88, the external curvature of which corresponds with the arc of a circle having as its center the axis of the plunger member 27'. The function of this arcuate member 88 will be apparent hereinafter.

The depending arm 86 of the bell-crank lever arm is provided at a suitable point intermediate its length with a cylindrical bar 89 extending transversely and to either side of the plane of oscillation of the lever. It will be noted that the bar 89 is of such length and is so disposed with its longitudinal axis substantially in the horizontal plane of the axis of movement of the lateral shift plungers 25' and 26' that as the bell-crank lever shifts in either direction relatively to said axis of movement, the said plungers 25' and 26' remain in engagement with the bar to effect oscillation of the gear shift lever 11' in one direction or the other.

The power cylinder unit

The power cylinder 19 is most clearly shown in Figures 6 and 8 wherein it will appear that it essentially consists of a double-acting piston unit having a pair of piston heads 91—92 secured to a common rod 93 having an annular yoke 94 formed centrally therein. The piston heads respectively slide in a pair of cylinder members 95—96 formed as integral parts of the main housing or support 61 and so provide a pair of fluid pressure chambers 44' and 45' which respectively are in communication with the conduits 46 and 47. The yoke 94 on the piston rod 93 so engages the arcuate end member 88 of the bell-crank gear shift lever 11' that as the piston unit of the power cylinder 19 moves in one direction or the other, it effects a corresponding movement of the gear shift lever and consequently of the particular gear shift rod with which the lever may be engaged. At the same time, however, the engagement between the shift lever and the power cylinder piston unit is such that the lever may be oscillated about the axis of the member 27' as a center without disturbing the coupling between the lever and piston rod, in consequence of which when the lever is shifted into operative engagement with any one of the gear shift rods, the rod so engaged may then be axially shifted to establish the desired gear relation.

Suitably mounted upon the main housing 61 is the oil storage reservoir 51' into which oil is pumped under pressure by way of the conduit 97 and from which it is delivered to the power cylinder by way of the conduits 48 and 49 leading to opposite ends of the power cylinder. The reservoir is equipped with a suitable check-valve 98 to insure unidirectional flow of the pressure fluid from the pump, into the reservoir and thence through one or the other of the conduits 48 and 49.

*The remote operating control mechanism*

This mechanism for actuating and controlling the operation of the gear selecting and shifting mechanisms hereinbefore described is shown in Figures 9 to 12, inclusive, the control mechanism being designed and constructed in the form of a compact unit which is adapted to be clamped, as at 99, upon the steering wheel column 100 immediately below the steering wheel so as to render the operating lever 24' readily accessible and convenient to the operator.

This operating lever 24' is preferably mounted for movements in a substantially vertical plane and in a horizontal plane, the direction of movement in the latter plane being generally forwardly and rearwardly along the line of travel of the vehicle. To provide for such movements, the inner end of the operating lever is secured, as at 101, to a vertically extending rod formed as part of a universally mounted spherically-shaped member 102 fitted within a stationary socket 103. This socket may be formed in any suitable manner as part of the casing or supporting structure for the operating unit, which structure also includes a pair of laterally spaced cylinders 104 and 105 disposed with their longitudinal axes paralleling each other and lying substantially in the horizontal plane of the center of the spherical member 102. In addition, the operating control unit includes a third cylinder 106 disposed below the cylinders 104 and 105 and with its longitudinal axis lying substantially in the vertical plane of the center of the spherical member 102.

Fitted in the cylinder 106 is the double-action plunger member 21', while fitted within the cylinders 104 and 105 are the single-action plunger members 22' and 23'. There are thus provided a plurality of fluid pressure chambers 38', 39', 40' and 41', which respectively communicate with the conduits 37, 36, 42 and 43 through which the fluid is selectively propelled in accordance with the direction of shift of the operating lever. The fluid columns in the several conduits are, of course, energized by actuation of the several plunger members and such actuation is effected by means of suitable arms which project radially from the spherical member 102 and respectively engage the several plunger members. Thus, as most clearly appears in Figure 11, the spherical member 102 is provided with a depending arm 107, the free end of which fits within a recess 108 formed in the plunger 21' to provide such rocking connection between the plunger and its actuating arm that as the operating lever 24' is raised into either of the dotted line positions A and B or lowered into either of the dotted line positions C and D, the plunger 21' is shifted longitudinally of its axis in proper direction to energize one or the other of the fluid columns in the conduits 36 and 37.

The spherical member 102 is further fitted with a transversely extending member 109 providing a pair of oppositely projecting arms 110 and 111 which respectively engage the plunger members 22' and 23' for selective actuation of the latter accordingly as the operating lever 24' is shifted in its horizontal plane of movement. It will be apparent that when the operating lever is shifted into the dotted line position E in Figure 10, the plunger 22' moves in a direction to energize the fluid column in the conduit 42 at the same time that the plunger 23' moves in reverse direction to deenergize the fluid column in the conduit 43. Exactly the reverse conditions obtain when the operating lever is shifted into the dotted line position F of Figure 10.

As is shown most clearly in Figures 10 and 11, a spring-pressed detent 112 is provided for normally retaining the operating lever in its neutral position, this detent being normally urged by its biasing spring into the vertically extending V-shaped groove 113 formed on one side of the spherical member 102. While this groove 113 in coaction with the detent 112 tends to hold the operating lever in its vertical plane of movement as it is raised or lowered out of its neutral position, it nevertheless permits shifting of the lever laterally of said plane of movement into one or the other of the dotted line positions shown in Figure 10. In either of these latter positions of the operating lever, the spring-pressed detent 112 will have been cammed out of the groove 113 by the inclined side wall thereof and will be in direct engagement with the arcuate surface of the spherical member 102.

*Operation of the apparatus*

In the operation of the apparatus hereinbefore described, it will be understood that the vehicle clutch (not shown) is disengaged prior to the selection and shifting into the desired gear speed, following which it is engaged in accordance with conventional practice, it being further understood that selection of any desired gear relation may be effected from either neutral or any gear relation theretofore established. Assuming that the apparatus is in neutral gear, as represented by the full line positions of the several parts of the apparatus shown in Figures 2 to 12, inclusive, should it be desired to shift into first speed, the operating lever 24' is depressed from the neutral or N position shown in Figure 11 into the dotted line position C. This causes the plunger 21' immediately associated with the operating lever to shift to the left (Figure 11) and so energizes the fluid column in conduit 37 to an extent sufficient to correspondingly shift the lateral control plunger 26' (Figure 8) for effecting engagement of the gear shift lever 11 with the yoke 13' of the gear shift rod 63. Having so preselected the shift rod 63 for actuation thereof, the operating lever 24' is then shifted laterally into the dotted line position E to thereby actuate the control plunger 22' (Figure 10). Upon movement of this plunger to the left, the fluid column in conduit 42 is energized to actuate the plunger element 28' controlling the valve 17' (see Figure 7) to thereby open the latter to the passage of high pressure fluid from the storage reservoir 51' to the cylinder head 44' of the power cylinder 19 by way of the conduits 50, 48 and 46. The opposite cylinder head 45' of the power cylinder, being in free communication with the sump or crank case through the conduits 47 and 54, the piston unit moves to the right and so imparts corresponding movement to the gear shift lever 11'. The gear shift lever, being in engagement with the gear shift rod 63, thus shifts the latter to the extent necessary to establish the desired first speed gear relation.

To thereafter shift into second gear, it is merely necessary to move the operating lever 24' from its dotted line position E into the dotted line position F of Figure 10, thereby actuating the plunger 23' and so activating the fluid column in the conduit 43 to open the valve 18', the valve 17' being then the one that remains closed. In this condition of the control valves, the power cylinder is shifted to the left and so causes the gear shift rod 63 to also move to the left to thereby establish the second speed gear relation. It will be noted that for both first and second speeds, the operating handle remains in the horizontal plane of the depressed position C of Figure 11.

For a shift into third gear, the operating lever 24' is raised from the neutral or N position into the dotted line position A, to thereby cause the control plunger 21' to shift to the right (Figure 11). This activates the fluid column in the conduit 36 to an extent sufficient to correspondingly shift the lateral control plunger 25' (Figure 8) to the left for the distance necessary to effect engagement of the gear shift lever 11' with the yoke 14' of the gear shift rod 64. Having so preselected the shift rod 64, the operating lever 24' is then shifted laterally into the dotted line position E to thereby actuate the control plunger 22' (Figure 10). Upon movement of this plunger to the left, the fluid column in conduit 42 is energized to actuate the plunger element 28' controlling the valve 17' (Figure 7) to thereby open the latter to the passage of high pressure fluid to the left hand head 44' of the power cylinder. The latter then shifts to the right and so imparts corresponding movement to the shift lever 11' and the preselected rod 64 connected thereto, thereby establishing the desired third speed gear relation.

To thereafter shift into fourth speed, it is merely necessary to move the operating lever 24' from its dotted line position E into the dotted line position F of Figure 10, thereby actuating the plunger 23' to move the fluid column in conduit 43 sufficiently to open the valve 18', the valve 17' remaining closed. In this condition of the valves, the power cylinder, and accordingly the gear shift rod 64, is moved to the left to establish the desired fourth speed gear relation. It will be noted that for both third and fourth speeds, the operating handle 24' remains in the horizontal plane of the raised position A of Figure 11.

For a shift into fifth speed or overdrive, the operating lever 24' is shifted to its extreme uppermost position (position B in Figure 11) to thereby so move the plunger 21' that the fluid column in conduit 36 shifts the lateral control plunger 25' to an extent sufficient to effect engagement of the shift lever 11' with the yoke 15' of the fifth speed shift rod 65. Thereupon, the operating handle is shifted laterally into the dotted line position E of Figure 10, to open the valve 17' as hereinbefore described and so cause actuation of the power cylinder to the right (Figure 6) thereby shifting the rod 65 in the required direction to establish the fifth speed gear relation.

Similarly, for shifting into reverse speed, the operating lever 24' is first depressed to its extreme lowermost position D (Figure 11) to thereby so move the plunger 21' that the fluid column in conduit 37 shifts the lateral control plunger 26' to an extent sufficient to effect engagement of the shift lever 11' with the yoke 12' of the reverse speed gear shift rod 62. Thereupon, the operating handle is shifted laterally into the dotted line position F of Figure 10, to open the valve 18' and so effect shifting of the power cylinder to the left (Figure 6), thereby shifting with it the gear shift rod 62 to establish the desired reverse speed gear relation.

It will be understood, of course, in accordance with the previous description of the operation of the system as shown in Figure 1, that in every power shift from neutral into an established gear relation and vice versa or from one gear relation to another, the power cylinder piston moves in substantial correspondence with the movement of the control lever and that the supply of the operating fluid pressure medium to the power cylinder is interrupted by the valves 17' and 18' automatically as the power cylinder piston moves into final position as determined by the position into which the remote control lever is manually shifted. Thus, there is no holding pressure exerted by the power cylinder unit upon a given gear shift rod while the latter is stationary, the function of the power cylinder unit being solely to perform the work of shifting a selected gear shift rod into and out of the desired established gear relation.

In order to enable the operator to "feel" that he is in proper position to establish any one of the desired speed gear relations, the coacting spring-pressed detents 69—69 and elongated depressions 68—68 have been provided in association with the lateral control plunger members 25' and 26' as shown most clearly in Figure 8. Normally, when the system is in neutral, the relative arrangement of these coacting elements is as shown with the detents respectively disposed centrally within the depressions 68—68. However, when the operating lever 24' is shifted in position C (Figure 11), the plunger members 25' and 26' shift to the left and so cause the right hand extremities of the depressions 68—68 to bear against the detents 69—69. Conversely, when the operating lever is shifted into position A, the plunger members 25' and 26' shift to the right and cause the left hand extremities of the depressions to bear against the detents. Thus, a resistance is encountered as soon as the operating lever fully reaches either of its positions A or C, which must be overcome before the lever may be shifted into either of positions B or D. In order to shift the operating lever into either of the latter positions, this initial resistance is overcome by the operator exerting the slightly greater effort which is required to cause the detents 69—69 to cam out of their respective retaining depressions 68—68 and ride onto the cylindrical surfaces of the plunger members.

Due to the fact that the central plunger member 27' of the longitudinal shift control mechanism 16 is direct-coupled for synchronous shifting movement with the piston unit of the power cylinder as well as with the gear shifting lever 11', it will be apparent that as the operating control lever 24' is shifted in its horizontal plane of movement into neutral position from either of its gear shifting positions E or F (Figure 10) to locate the power cylinder piston in its centered or neutral position, the plunger member 27' likewise will be brought into centered or neutral position, in consequence of which the fluid columns in the conduits 42 and 43 will be in statically balanced condition. In this condition of the apparatus, the control valves 17' and 18' will both be closed against the passage of any high pressure fluid to either end of the power cylinder, both ends of the latter being then vented to the sump or crank case by way of the conduits 53 and 54.

When the operating control lever 24' is shifted into neutral position from any of the gear selecting positions A, B, C or D (see Figure 11), the plunger members 25' and 26' will be brought into the centered or neutral position shown in Figure 8 through the balancing action of the fluid columns in the conduits 36 and 37 assisted by the balancing action of the opposed biasing springs 25ᵃ and 26ᵃ.

In the event of failure of a fluid pressure supply to the power cylinder so that the latter is incapable of operating automatically upon opening of the appropriate control valve to effect the desired shifting of the gears, such shifting may nevertheless be effected manually by one or the other of the fluid columns in the conduits 42 and 43 depending upon the direction of shift desired. Thus, should it be necessary to manually shift a given shift rod, say 63, to the right (see Figure 7), then the operating control lever 24' is operated exactly as for opening the valve 17' to energize the fluid column in the conduit 42. By exerting a somewhat greater effort on the operating handle than would be required merely to actuate the plunger element 28' to open the valve, the fluid column acts on the proximate end of the plunger 27' to cause it to shift to the right and so move the gear shift rod 63 through the intervention of the interconnected gear shift lever 11'. Should it be desired to shift the same rod to the left (Figure 7 again), then the operating control lever 24' is operated as for opening the valve 18' with sufficient pressure exerted thereon to cause the fluid column in conduit 43 to shift the plunger 27' to the left.

It will be understood, of course, that the apparatus of the present invention is susceptible of various changes and modifications in design, construction and relative arrangement of parts without departing in any material respect from the real spirit or general principles of the invention. Examples of such changes and modifications are shown in Figures 13 to 19, inclusive, wherein, to avoid unnecessary repetition of description and at the same time facilitate comparison with parts heretofore described, all those parts in Figures 13 to 19 having structural characteristics and operating functions similar to those hereinbefore described are designated by the same reference numerals but with a double instead of single prime symbol.

Thus, Figures 13, 14 and 15 show a somewhat more compact arrangement of the apparatus which is directly associated with the gear transmission, while Figures 16, 17 and 19 show a modified construction of the remote control apparatus. Obviously, inasmuch as the transmission-associated apparatus and the remote control apparatus are operatively connected only by fluid conduits, either of the structural arrangements shown in Figures 3 to 8 or in Figures 13 to 16 may be employed in association with the control mechanism of the form shown in Figures 9 to 12, and conversely either of the two forms of control mechanism may be employed in association with the transmission-associated mechanism of Figures 13 to 16, which latter will now be described.

In this modified construction of the transmission-associated apparatus, it will be observed that the longitudinal shift control mechanism 16" and the power cylinder unit 19" are arranged with their longitudinal axes spaced one above the other in a common vertical plane, while the lateral shift control mechanism 10" is relatively so arranged that its axis of operation, which extends at right angles to said vertical plane, is in the same horizontal plane as the axis of the power cylinder. This provides for a somewhat more direct, more positive and yet simpler operating connection between the power cylinder and the gear shift lever 11" in that it avoids the laterally offset relation of power cylinder and longitudinal shift control mechanism of the previously described construction and so eliminates the necessity of employing the bell-crank lever arrangement of Figure 8. At the same time, it permits such relative arrangement of the power cylinder and the control valves therefor as to eliminate the necessity of the conduits 46 and 47 (see Figure 1), the ports 83" and 84" in the valve casings being respectively in direct communication with the chambers 44" and 45" of the power cylinder.

As clearly appears in Figure 14, the power cylinder unit 19" is arranged just below the longitudinal shift control mechanism, and to provide for the necessary gear shifting connection between the plunger member 27" of the longitudinal shift control, the piston rod 93" of the power cylinder and the gear shift lever 11", the said piston rod 93" is provided intermediate its length with a rectangularly shaped yoke 115. The axially spaced side members 116—116 (Figure 14) of this yoke are internally finished to provide parallel guide surfaces 117—117, while the laterally spaced side members 118—118 (Figure 15) of the yoke are finished on their lower edges to provide flat bottom guide surfaces 119—119.

The gear shift lever 11" is secured, as at 120ᵃ, to the central plunger member 27" of the longitudinal shift control mechanism and projects downwardly therefrom through the yoke 115 for selective engagement of its free lower end with any one of the clevises of the gear shift rods 62, 63, 64 and 65. As is best shown in Figure 14, the gear shift lever 11" is provided intermediate its length with a cylindrical bar element 120 which is so slidably disposed within the yoke 115 as to be axially shifted with the latter upon operation of the power cylinder in one direction or the other, at the same time that it is free to shift laterally of the power cylinder axis under the influence of the lateral shift control mechanism 10". To this end, the cylindrical bar element 120, which serves the same function as the bar 89 of the construction shown in Figure 7, is of a length to snugly fit between the finished internal guide surfaces 117—117 of the yoke so that movement of the yoke in either direction effects corresponding movement of the bar 120, the latter being free, however, to shift bodily across the width of the yoke when the gear shift lever 11" is rotated about the axis of the plunger 27" as a center.

Referring to Figure 15, it will be observed that the inner portions of the plunger members 25' and 26" of the lateral shift control mechanism 10" respectively project through the opposite side members 118—118 of the yoke 115 for contacting engagement with opposite sides of the bar 120. In order to prevent rotation of the plunger members 25" and 26" in their respective guides or cylinders, the inner freely projecting portions thereof are flattened, as at 121—121, for sliding fit with the bottom portion 119—119 of the yoke 115. In their respective sliding fit with the bottom portion 119—119 of the yoke 115, the projecting guides or faces 119 of the yoke 115 and 121—121 of plunger 120, the coacting elements 119 and the coacting elements 70—70 of the bar 120.

understood, therefore, that the lateral shift control mechanism of Figure 16 is similar in material respect to that previously described for the mechanism of Figures 16 and 20.

Figure 19 shows in somewhat enlarged constructional details of a preferred construction of one of the valve units provided with a longitudinal shift control mechanism, tively 126 and 130.

Figure 19 shows the mechanism of Figure 15 described for respect similar to that previously control mechanism of Figures 16 understood, therefore, that the lateral shift site directions and extending between said lever shifting means and said plunger means and adapted upon shifting thereof in one selected direction to transmit a power thrust to said shifting means for moving said gear shift lever in correspondence with the movement of said plunger means, and means for resiliently detaining the gear shifting lever in an intermediate position located between neutral and either of the two opposite extreme positions which the said lever may assume.

2. In apparatus for shifting the gears of a change-speed gear transmission of the type having operatively associated therewith a plurality of gear shifting rods and a gear shift lever shiftable into engagement with any one of said rods—hydraulically operated shifting means operatively associated with the shift lever, remotely located plunger means for controlling the operation of said lever shifting means, a normally static fluid column selectively shiftable in opposite directions and extending between said lever shifting means and said plunger means and adapted upon shifting thereof in one selected direction to transmit a power thrust to said shifting means for moving said gear shift lever in correspondence with the movement of said plunger means, and spring-pressed detent means operative to permit said gear shifting lever to be moved freely from neutral to an intermediate position and to impose an overcomable resistance against continued movement of said lever beyond said intermediate position.

3. In apparatus for shifting the gears of a change-speed gear transmission of the type having operatively associated therewith a plurality of gear shifting rods and a pivoted gear shift lever capable of being swung about its pivot for operative engagement with any one of said rods—hydraulically operated plunger means disposed in embracing relation with respect to said pivoted lever and operative upon actuation thereof to swing said lever in one direction or the other, means tending normally to maintain said plunger means centered whereby to retain said lever in neutral position, spring-pressed means coacting with said plunger means for imposing an overcomable resistance against movement of the lever beyond intermediate positions located to either side of its neutral position, and a pair of normally static fluid columns selectively actuatable to shift said plunger means unidirectionally in one direction or the other through either of two stages of movement, each of said fluid columns being shiftable in opposite directions.

4. In apparatus for shifting the gears of a change-speed gear transmission of the type having operatively associated therewith a plurality of gear shifting rods and a pivoted gear shift lever capable of being swung about its pivot for operative engagement with any one of said rods:—hydraulically operated plunger means disposed in embracing relation with respect to said pivoted lever and operative upon actuation thereof to swing said lever in one direction or the other, means tending normally to maintain said plunger means centered whereby to retain said lever in neutral position, spring-pressed means coacting with said plunger means for imposing an overcomable resistance against movement of the lever beyond intermediate positions located to either side of its neutral position, a pair of normally static fluid columns selectively actuatable to shift said plunger means unidirectionally in one direction or the other through either of two stages of movement each of said fluid columns being bodily shiftable in opposite directions, and means on said lever for permitting movement thereof in a direction normal to its plane of swinging movement without disrupting the operative engagement of said plunger means with respect to said lever.

5. In apparatus for shifting the gears of a change-speed gear transmission of the type having operatively associated therewith a plurality of gear shifting rods and a pivoted gear shift lever capable of being swung about its pivot for operative engagement with any one of said rods:—hydraulically operated plunger means disposed in embracing relation with respect to said pivoted lever and operative upon actuation thereof to swing said lever in one direction or the other, means tending normally to maintain said plunger means centered whereby to retain said lever in neutral position, spring-pressed means coacting with said plunger means for imposing an overcomable resistance against movement of the lever beyond intermediate positions located to either side of its neutral position, a pair of normally static fluid columns selectively actuatable to shift said plunger means unidirectionally in one direction or the other through either of two stages of movement each of said fluid columns being bodily shiftable in opposite directions, and means on said lever for permitting movement thereof in a direction normal to its plane of swinging movement without disrupting the operative engagement of said plunger means with respect to said lever, said last-mentioned means including a bar extending transversely of the lever and disposed with its axis extending normal to and substantially in the horizontal plane of the operating axis of said plunger means.

6. In an apparatus for shifting the gears of of a change-speed gear transmission of the type having operatively associated therewith a plurality of gear shifting rods and a gear shift lever pivoted for angular movement in a given plane for engagement with a selected one of said gear shifting rods and shiftable bodily along its pivoted axis to axially shift the selected rod:— a pair of selectively actuatable normally static fluid columns respectively operable to transmit shifting effort alternately to opposite sides of the gear shift lever, said columns being relatively so operative that simultaneously as one exerts its said shifting effort, the other is free of such effort, means responsive to movement thereof for angularly shifting said lever about its pivot, and means for maintaining said shift lever in operative engagement with the selected shift rod under the thrust exerted by operative fluid column during the rod-shifting movement of the lever.

7. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod:— fluid pressure power means for shifting said lever, normally closed valves for controlling the supply of pressure fluid to said power means, and normally static fluid columns selectively actuatable by remote control for opening one or the other of said valves to render said power means operative to shift the preselected rod.

8. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod:—fluid-pressure-operated power means for shifting said shift lever, control means for said power means, a remotely located operating mechanism for said control means, and a plurality of normally static fluid columns extending between said control means and operating mechanism and being selectively actuatable to operate the control means whereby the power means is automatically operated under fluid pressure to shift the selected rod.

9. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod:—fluid-pressure-operated power means for shifting said shift lever, control means for said power means, a remotely located operating mechanism for said control means, and a plurality of normally static fluid columns extending between said control means and operating mechanism and being selectively energizable to operate the control means whereby the power means is automatically operated under fluid pressure to shift the selected rod, said selectively energizable fluid columns being respectively in the form of confined hydraulic systems independent of each other and of the fluid pressure system for operation of the power means.

10. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod:—fluid-pressure-operated power means for said shift lever, a longitudinal shift control mechanism for the power means including a pair of plunger-actuated valves and means normally maintaining said valves closed, and a pair of remotely energizable normally static fluid columns operative upon the valve actuating plungers to open one or the other thereof for automatic operation of the power means.

11. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod—fluid-pressure-operated power means for said shift lever, a longitudinal shift control mechanism for the power means including a pair of plunger-actuated valves and means normally maintaining said valves closed, and a pair of remotely energizable normally static fluid columns operative upon the valve actuating plungers to open one or the other thereof for automatic operation of the power means, said longitudinal shift control mechanism including also a double-action plunger centrally disposed between and in axial alinement with said valve-actuating plungers and connected to said shift lever for positioning the latter in neutral position when said fluid columns are in normally balanced condition.

12. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod—fluid-pressure-operated power means for said shift lever, a longitudinal shift control mechanism for the power means including a pair of plunger-actuated valves and means normally maintaining said valves closed, and a pair of remotely energizable normally static fluid columns operative upon the valve actuating plungers to open one or the other thereof for automatic operation of the power means, said longitudinal shift control mechanism including also means direct-connected to said gear shift lever and subject to the power thrusts respectively transmitted by said fluid columns for positioning the shift lever in neutral position when said fluid columns are in balanced condition.

13. In an apparatus for shifting the gears of a change-speed gear transmission of the type having operatively associated therewith a plurality of gear shifting rods and a gear shift lever movable in one direction for engaging and in another direction for shifting a selected one of said gear shifting rods—fluid-pressure-operated means for moving said lever in rod-shifting direction, a longitudinal shift control mechanism including a pair of hydraulically-operated control valves for the power means and an intervening hydraulically-actuated plunger element operatively associated with the gear shift lever for movement therewith under the influence of said power means, and a pair of normally static fluid columns selectively operative to open one or the other of said control valves for automatic operation of the power means, said intervening plunger being responsive to said fluid columns for positioning the shift lever and the power means in neutral position when said valves are closed.

14. In an apparatus for shifting the gears of a change-speed gear transmission of the type having operatively associated therewith a plurality of gear shifting rods and a gear shift lever movable in one direction to select and in another direction to shift one of said rods—fluid-pressure-operated means for moving said lever in rod-shifting direction, a longitudinal shift control mechanism including valve means for controlling the supply of pressure fluid to said power means, a pair of normally static fluid columns bodily shiftable in opposite directions and operatively associated with said pressure fluid control means and arranged in normally balanced condition to maintain said valve means inoperative to permit the delivery of pressure fluid to said power means, and a remotely located operating mechanism for unbalancing said fluid columns whereby to render said valve means operative to effect energization of said power means.

15. In an apparatus for shifting the gears of a change-speed gear transmission of the type having operatively associated therewith a plurality of gear shifting rods and a gear shift lever movable in one direction to select and in another direction to shift one of said rods—fluid-pressure-operated means for moving said lever in rod-shifting direction, a longitudinal shift control mechanism including valve means for controlling the supply of pressure fluid to said power means, a pair of normally static fluid columns bodily shiftable in opposite directions and operatively associated with said pressure fluid control means and arranged normally in statically balanced condition to maintain said valve means inoperative to permit the delivery of pressure fluid to said power means, a remotely located operating mechanism for unbalancing said fluid columns whereby to render said valve means operative to effect energization of said power means, and means in said longitudinal shift control mechanism for rendering said valve means inoperative to effect energization of said power means automatically upon movement of the latter into a desired final position.

16. In an apparatus for shifting the gears of a change-speed gear transmission of the type having operatively associated therewith a plurality of gear shifting rods and a gear shift lever movable in one direction to select and in another direction to shift one of said rods—fluid-pressure-operated means for moving said lever in rod-shifting direction, a longitudinal shift control mechanism including valve means for controlling the supply of pressure fluid to said power means, a pair of normally static fluid columns bodily shiftable in opposite directions and operatively associated with said pressure fluid control means and arranged normally in statically balanced condition to maintain said valve means inoperative to permit the delivery of pressure fluid to said power means, a remotely located operating mechanism for unbalancing said fluid columns whereby to render said valve means operative to effect energization of said power means, and means in said longitudinal shift control mechanism operative to re-establish said statically balanced condition of the fluid columns automatically upon movement of the power means into either neutral position or any of its final gear establishing positions.

17. In an apparatus for shifting the gears of a change-speed gear transmission of the type having operatively associated therewith a plurality of gear shifting rods and a gear shift mechanism for selectively engaging and shifting of one of said rods:—a remotely located operating mechanism for said gear shift mechanism including a universally mounted operating handle, a plurality of pairs of fluid column extending between said gear shift mechanism and said operating mechanism, each pair of said columns being normally in statically balanced condition, and means actuated by said operating handle to sequentially effect unbalancing of said pairs of fluid columns whereby to actuate said gear shift mechanism to first engage and then shift a selected gear shifting rod.

18. In an apparatus for shifting the gears of a change-speed gear transmission of the type having operatively associated therewith a plurality of gear shifting rods and a gear shift mechanism operative to selectively engage and axially shift one of said rods:—a remotely located operating mechanism for said gear shift mechanism including an operating handle capable of moving in intersecting planes, a pair of fluid columns extending between said gear shift mechanism and said operating mechanism for effecting actuation of said gear shift mechanism to engage the selected rod to be shifted, a second pair of fluid columns also extending between said mechanisms for rendering the gear shift mechanism effective to shift the selected rod, each pair of said fluid columns being in statically balanced condition when the transmission is in neutral, and means operatively associated with said operating handle to unbalance one pair of said fluid columns when the handle is moved in one of its planes of movement and to unbalance the other pair of said fluid columns when the handle is moved in the other plane.

19. In an apparatus for shifting the gears of a change-speed gear transmission of the type having operatively associated therewith a plurality of gear shifting rods and a gear shift mechanism operative to selectively engage and axially shift one of said rods, and a remotely located operating mechanism for said gear shift mechanism including an operating handle capable of moving in intersecting planes:—a pair of fluid columns extending between said gear shift mechanism and said operating mechanism for effecting actuation of said gear shift mechanism to engage the selected rod to be shifted, a second pair of fluid columns also extending between said mechanisms for rendering the gear shift mechanism effective to shift the selected rod, each pair of said fluid columns being in statically balanced condition when the transmission is in neutral, and means operatively associated with said operating handle to unbalance one pair of said fluid columns when the handle is moved in one of its planes of movement and to unbalance the other pair of said fluid columns when the handle is moved in the other plane, said last-mentioned means being operative to transmit the resultant thrust of each unbalanced pair of fluid columns in either of two directions in accordance with the direction of movement of the operating handle.

20. In an apparatus for shifting the gears of a change-speed gear transmission of the type having operatively associated therewith a plurality of gear shifting rods and a gear shift mechanism operative to selectively engage and axially shift one of said rods, and a remotely located operating mechanism for said gear shift mechanism including an operating handle capable of moving in intersecting planes:—a pair of fluid columns extending between said gear shift mechanism and said operating mechanism for effecting actuation of said gear shift mechanism to engage the selected rod to be shifted, a second pair of fluid columns also extending between said mechanisms for rendering the gear shift mechanism effective to shift the selected rod, each pair of said fluid columns being in statically balanced condition when the transmission is in neutral, and means operatively associated with said operating handle to unbalance one pair of said fluid conduits when the handle is moved in one of its planes of movement and to unbalance the other pair of said fluid columns when the handle is moved in the other plane, said last-mentioned means being operative to transmit the resultant thrust of each unbalanced pair of fluid columns in either of two opposite directions and for a distance corresponding with the direction and extent of movement of the handle.

21. In an apparatus for shifting the gears of a change-speed gear transmission of the type having operatively associated therewith a plurality of gear shifting rods and a gear shift lever movable angularly to engage and shiftable bodily to axially shift one of said rods, a lateral shift control mechanism and a longitudinal shift control mechanism each operatively associated with the gear shift lever, and a fluid-pressure-operated power cylinder also operatively associated with the gear shift lever, said power cylinder being connected to a source of high pressure fluid and said longitudinal shift control mechanism including valve means normally interrupting the supply of said fluid to said power cylinder:—statically balanced fluid columns operative upon opposite sides of each said lateral and longitudinal shift control mechanisms for maintaining the same in centered or neutral position with the said valve means closed, and remotely located control means operative to sequentially unbalance said statically balanced fluid columns to create resultant thrusts for actuating said lateral and longitudinal shift control mechanisms whereby the former operates to effect engagement of the shift lever with a selected gear shifting rod and the latter operates to open said valve means for supplying the high pressure operating fluid to the power cylinder.

22. In an apparatus of the character defined in claim 21 wherein said last-mentioned means is operative to change the direction of each of the resultant thrusts created by the unbalancing of said fluid columns.

23. In an apparatus of the character defined in claim 21 wherein said last-mentioned means is operative to change the direction and extent of the resultant thrust created for actuating said lateral shift control mechanism.

24. In an apparatus for shifting the gears of a change-speed gear transmission of the type having operatively associated therewith a plurality of gear shifting rods and a gear shift lever movable in one direction to select and in another direction to shift one of said rods:—fluid-pressure-operated means for moving said lever in rod-shifting direction, a longitudinal shift control mechanism including valve means for controlling the supply of pressure fluid to said power means, a pair of normally static fluid columns operatively associated with said pressure fluid control means and arranged normally in statically balanced condition to maintain said valve means inoperative to permit the delivery of pressure fluid to said power means, a remotely located operating mechanism for unbalancing said fluid columns whereby to render said valve means operative to effect energization of said power means, and means in said longitudinal shift control mechanism operative to re-establish said statically balanced condition of the fluid columns automatically upon movement of the power means into either neutral position or any of its final gear establishing positions, said last-mentioned means including a longitudinally shiftable plunger operative, when subjected to the thrust of the unbalanced fluid columns, to effect shifting of the selected gear shifting rod in the event of interruption of pressure fluid to the power means.

25. In an apparatus for shifting the gears of a change-speed gear transmission of the type having operatively associated therewith a plurality of gear shifting rods:—fluid-pressure-operated power means for shifting a selected one of said gear shifting rods, a longitudinal shift control mechanism operatively associated with said power means and including valve means for controlling the supply of pressure fluid to said power means, a remotely located operating lever for said shift control mechanism, a pair of fluid columns normally in static balance extending between said shift control mechanism and said operating lever and operative to exert a thrust in either of two directions to render said valve means operative to effect energization of the power means upon movement of the control lever, and means in said longitudinal shift control mechanism for insuring such correspondence in movement of the control lever and the power means that the final position of the former determines the final position of the latter.

26. In an apparatus for shifting the gears of a change-speed gear transmission of the type having operatively associated therewith a plurality of gear shifting rods:—fluid-pressure-operated power means for shifting a selected one of said gear shifting rods, a longitudinal shift control mechanism operatively associated with said power means and including valve means for controlling the supply of pressure fluid to said power means, a remotely located operating lever for said shift control mechanism, a pair of fluid columns normally in static balance extending between said shift control mechanism and said operating lever and operative to exert a thrust in either of two directions to render said valve means operative to effect energization of the power means upon movement of the control lever, and means in said longitudinal shift control mechanism for effecting corresponding movement between the control lever and the power means and for interrupting the supply of fluid pressure to the power means automatically as the latter assures a final position as determined by the position of the control lever.

27. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod:—fluid pressure power means for shifting said lever, normally closed valves for controlling the supply of pressure fluid to said power means, and normally static fluid columns selectively energizable by remote control for opening one or the other of said valves to render said power means operative to shift the selected rod, and means for expending the valve-actuating force of the selected fluid column automatically as said power means is shifted into a final position.

28. In an apparatus for shifting the gears of a change-speed gear transmission of the type having operatively associated therewith a plurality of gear shifting rods and a gear shift lever angularly movable for engagement with a selected one of said gear shifting rods and bodily shiftable to axially shift the selected rod:—fluid-pressure-operated power means for shifting said shift lever, control means for said power means, a remotely located operating mechanism for said control means, and a plurality of normally static fluid columns extending between said control means and operating mechanism and being selectively energizable to operate the control means whereby the power means is automatically operated under fluid pressure to shift the selected rod, said control means being operative by said remotely located operating mechanism for expending the valve-actuating force of the selected fluid column and so interrupting the supply of pressure fluid to the power means automatically as said power means is shifted into the desired final position determined by said remotely located operating mechanism.

BENJAMIN B. BACHMAN.
CHARLES E. FOGG.

(References on following page)

REFERENCES CITED

The following references are of record in the file of this patent:

UNITED STATES PATENTS

| Number | Name | Date |
|---|---|---|
| 752,491 | Warren | Feb. 16, 1904 |
| 897,907 | Lang | Sept. 8, 1908 |
| 1,647,895 | Weaver et al. | Nov. 1, 1927 |
| 1,934,206 | Page | Nov. 7, 1933 |
| 2,034,400 | Kesling | Mar. 17, 1936 |
| 2,044,463 | Burt | June 16, 1936 |
| 2,137,961 | Vorech | Nov. 22, 1938 |
| 2,138,148 | Eckert | Nov. 29, 1938 |
| 2,146,030 | Schjolin | Feb. 7, 1939 |
| 2,181,532 | Hill et al. | Nov. 28, 1939 |
| 2,212,442 | Kliesrath et al. | Aug. 20, 1940 |
| 2,236,467 | Clench | Mar. 25, 1941 |
| 2,242,542 | Peterson et al. | May 20, 1941 |
| 2,276,862 | Peterson et al. | Mar. 17, 1942 |
| 2,297,026 | Sanford et al. | Sept. 29, 1942 |
| 2,346,820 | Casler et al. | Apr. 18, 1944 |

FOREIGN PATENTS

| Number | Country | Date |
|---|---|---|
| 781,511 | France | Feb. 25, 1935 |